Feb. 13, 1934.  H. W. SANFORD  1,947,361
MINE CAR BRAKE
Filed Aug. 8, 1932   3 Sheets-Sheet 1
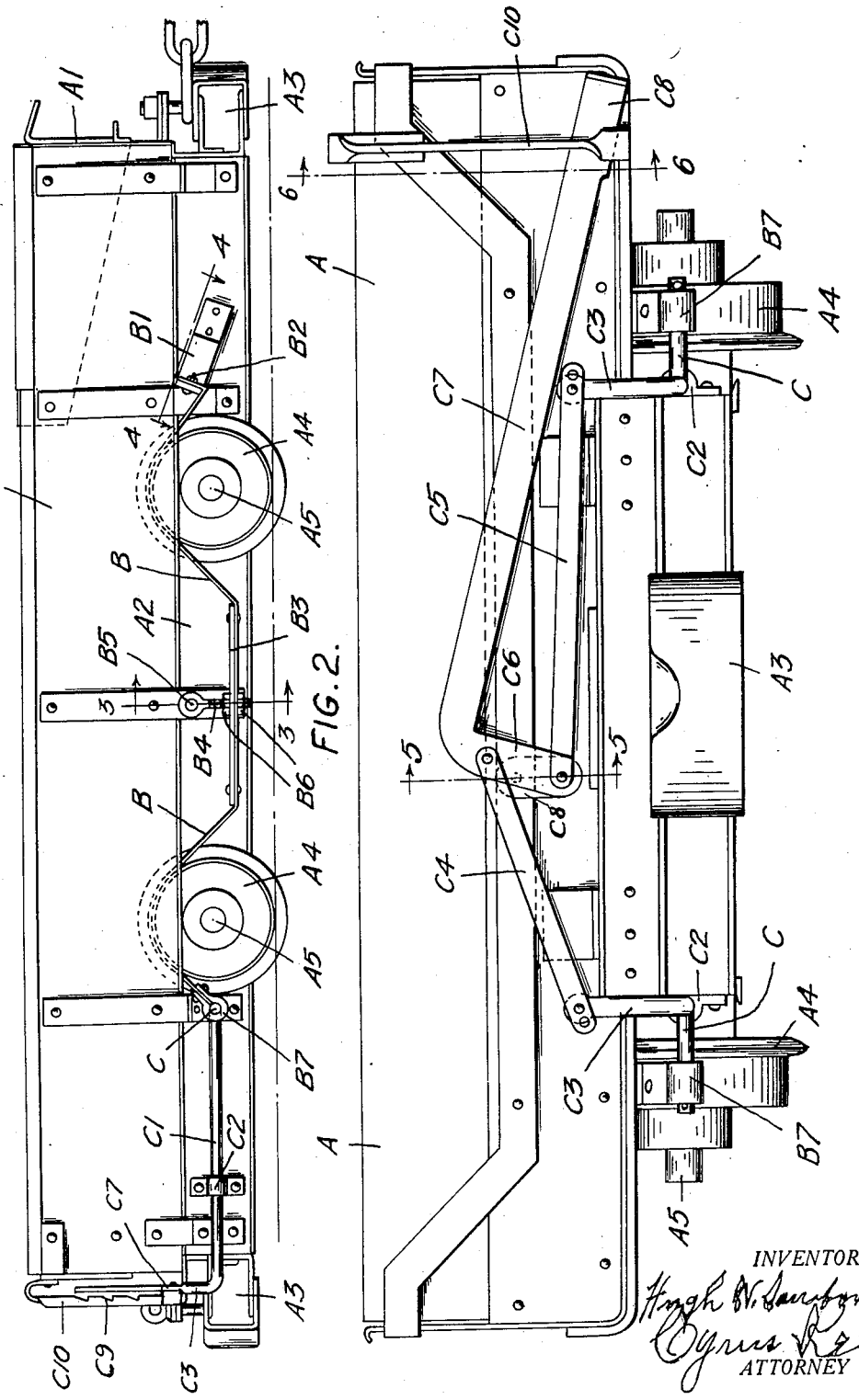
INVENTOR.
Hugh W. Sanford
Cyrus Kehr
ATTORNEY Feb. 13, 1934.  H. W. SANFORD  1,947,361
MINE CAR BRAKE
Filed Aug. 8, 1932   3 Sheets-Sheet 2
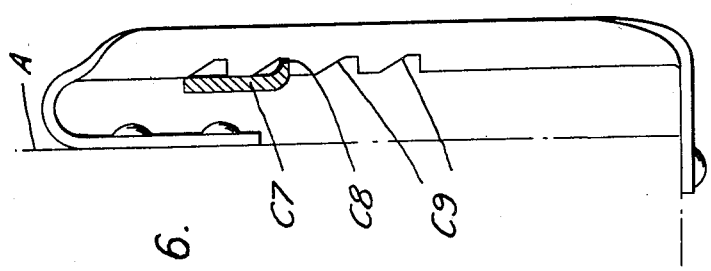
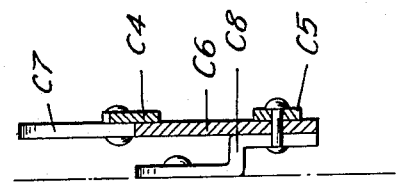
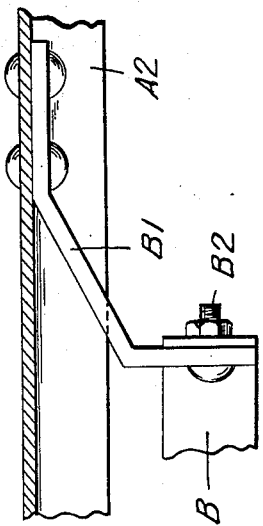
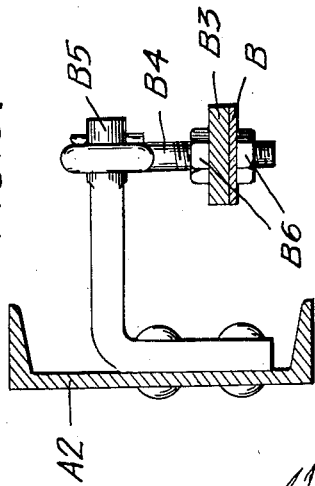
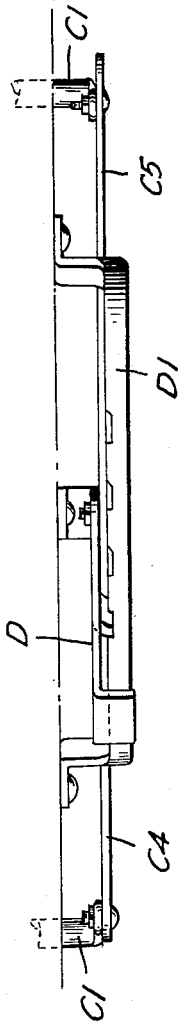
INVENTOR.
Hugh W. Sanford
BY
ATTORNEY

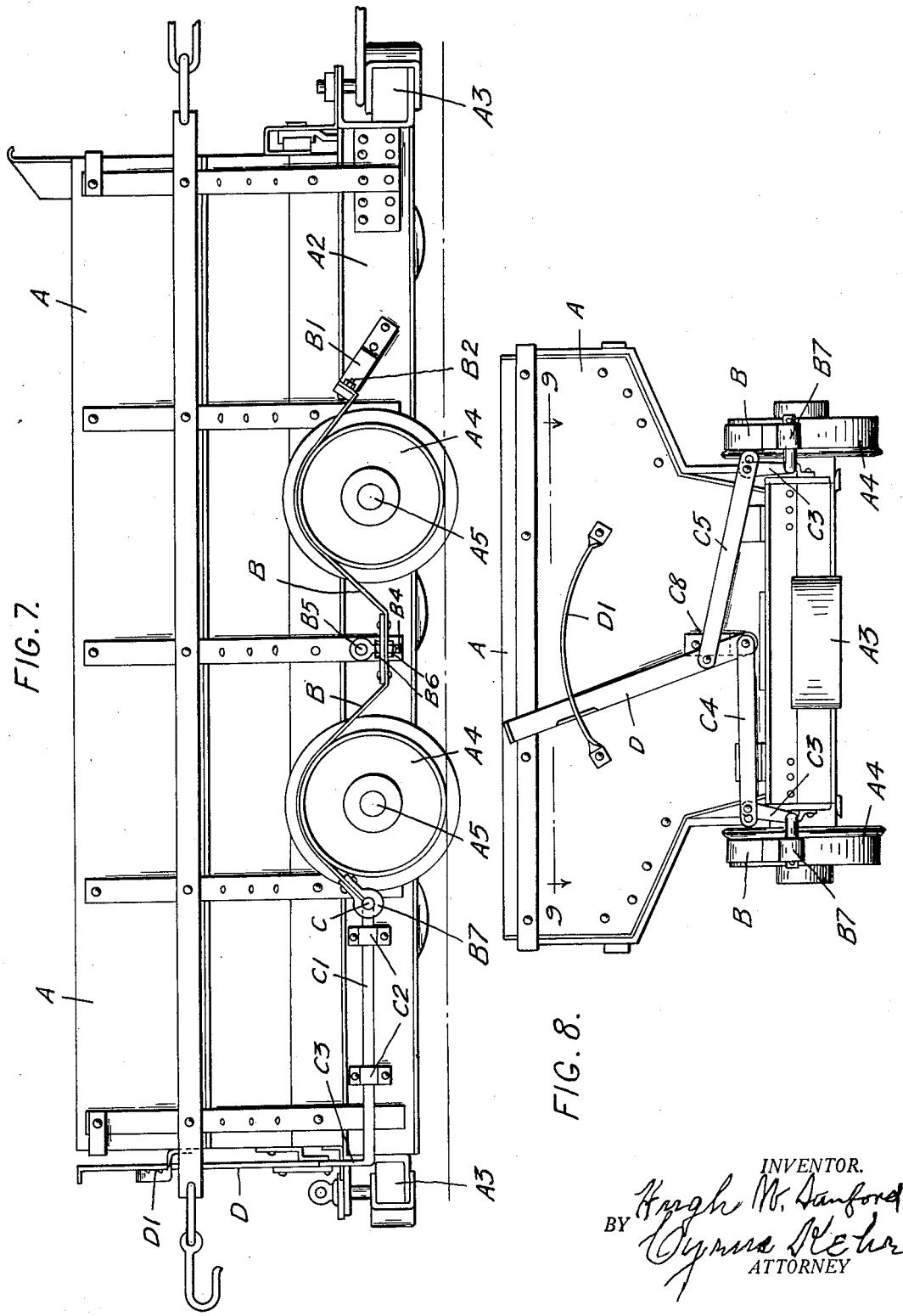

Patented Feb. 13, 1934

1,947,361

UNITED STATES PATENT OFFICE 1,947,361

MINE-CAR BRAKE

Hugh W. Sanford, Knoxville, Tenn.

Application August 8, 1932. Serial No. 627,947

16 Claims. (Cl. 188—57)

This invention relates to an improvement in mine car brakes. The object of this invention is to provide for applying pressure to the brake band of one wheel through the action of the brake band operating on the other wheel on a corresponding side of the mine car. Between the two wheels, the brake band passes around a swinging toggle which has provision for adjustment of the band, so that it may be lengthened or shortened to provide the proper relation of the band with reference to the wheels.

In the accompanying drawings,

Fig. 1 is a side elevation of an end dump mine car, having the present invention applied thereto;

Fig. 2 is an end elevation thereof on an enlarged scale;

Fig. 3 is a partial sectional view on the line 3—3, of Fig. 1;

Fig. 4 is a similar view on the line 4—4, of Fig. 1;

Fig. 5 is a similar view on the line 5—5, of Fig. 2;

Fig. 6 is a similar view on the line 6—6, of Fig. 2;

Fig. 7 is a side elevation of a drop bottom car, having the invention applied thereto;

Fig. 8 is an end elevation of the same; and

Fig. 9 is a partial sectional view on the line 9—9, of Fig. 8.

The invention is shown in Figs. 1 and 2, as applied to an end dump car, the body of which is designated generally A, and is provided with an end dumping door, A1. Side sills are designated A2, and are connected together by combined end sills and bumper structures, A3. Wheels are designated A4 and are mounted on axles A5.

The brakes embodying this invention, each comprises a brake band B, extending over both of the wheels A4, on each side of the mine car and has one end attached to an anchor B1, which is shown in Fig. 4 as an angle member extending laterally from a side sill A2 being securely fastened thereto. This anchor B1 is attached to the brake band B, by means of a bolt B2 or other suitable fastening means.

Intermediate the wheels A4, the brake band is engaged by a reinforcing plate B3, shown in Fig. 3 of the drawings, and adjustably connected therewith is an eye-bolt toggle B4, the eye of which is journaled on an arm B5, extending laterally from and secured to one of the side sills A2. Nuts B6 are threaded onto the toggle B4 on opposite sides of the brake band B and the plate B3, so as to adjust the band relative to the toggle and thereby to vary the tension of the band on the wheels.

The free end of the brake band B is provided with a loop B7 receiving an arm C, extending laterally from a roller bar C1, which is journalled in a hanger C2, attached to a side of the side sill A2. The extreme outer end of the roller bar C1 has an up-turned arm C3, which is adapted to be operated to apply or release the brakes.

The up-turned arms C3, on opposite sides of the car are adapted to be operated together to apply equal brake pressure to the wheels on both sides of the car. To accomplish this, the upper ends of the arms C3 are pivotally connected to the outer ends of links C4 and C5, the inner ends of which links are pivotally connected with a down-turned portion C6, of a lever C7, at spaced points. The lower end of the portion C6 is pivoted to an equalizer hanger C8, which in turn is pivoted at its upper end to an end of the car body A.

The pivoted hanger equalizer C8, together with the off-center pivoting of the links C4 and C5, with the down-turn portion C6, as well as the unequal lengths of the links C4, serves to apply equal pressures to both of the brake bands on opposite sides of the car.

The outer free end of the lever C7 is provided with an out-turned edge C8, to engage ratchet teeth C9 on a rack C10 having its opposite ends attached to an end of the car body A, so as to hold the brake lever C7, and thereby the brake bands in set positions.

The swinging of the arms C3 in opposite directions causes a turning of the roller bars C1, to swing both of the arms C downward, and thereby apply a downward pull on each of the brake bands B. This not only applies a braking action to the foremost wheels, but the pull on the brake bands swings the toggles B4, and thereby also applies a downward pull on the rear half of each brake band to apply an equal braking action on the other wheel. In other words, by pulling one end of the brake band an equal braking action is applied to both wheels and this braking action may be adjusted by adjusting the toggle connected with the brake band.

The invention is shown in Figs. 7 and 8 as applied to a drop bottom mine car and corresponding parts are designated by the same reference characters. The structure differs however from that shown in Figs. 1 and 2, in the means for turning the roller bars C1, to apply the brakes.

The links C4 and C5 which are connected with the arms C3, extend to and are pivotally connected with an upright lever D, pivoted at its lower end to an equalizer hanger C8 and extends upwardly therefrom through a rack D1 secured to an end of the car A. The swinging of the lever D, serves to equally apply the brakes on both sides of the car and to all of the wheels in the manner above described.

I claim:

1. In a mine car, the combination with a plurality of wheels at a side of the car, a brake band extending into operative relation with said wheels, means for applying a pulling action to an end portion of said brake band, and means for applying approximately equal braking action to the wheels when the end portion thereof is pulled.

2. In a mine car, the combination with a plurality of wheels at a side of the car, of a brake band extending over the plurality of wheels, means for anchoring an end portion of the brake band, means for applying a pulling action to the opposite end portion of the brake band, and means intermediate the wheels for equalizing the braking action on the wheels when the pulling action is applied to an end portion of the brake band.

3. In a mine car, the combination with a plurality of wheels on a side of the car, of a brake band extending over said plurality of wheels, means for anchoring an end portion of the brake band, means for applying a pulling action to the opposite end portion of the brake band, and toggle means connected with the brake band intermediate the wheels for causing a braking action to be applied to the wheels by the pulling action on the end portion of the band.

4. In a mine car, the combination with a plurality of wheels on a side of the car, of a single brake band extending over the plurality of wheels, means for anchoring an end portion of the brake band, means for applying a pulling action to the opposite end portion of the brake band, and a toggle connected with the brake band intermediate the wheels for causing an equal application of the brake band to the plurality of wheels by the pulling action on an end of said band.

5. In a mine car, the combination with a plurality of wheels on a side of the car, of a brake band extending over the plurality of wheels, means for anchoring an end portion of the brake band, a roller bar having a laterally extending arm connected with the opposite end portion of the brake band for applying a pulling action thereto, a toggle connected with the brake band intermediate the wheels, and means mounting the toggle for swinging movement only.

6. In a mine car, the combination with a plurality of wheels at a side of the car, of a brake band extending over the plurality of wheels, means for anchoring an end portion of the brake band, a roller bar having a laterally extending arm connected with the end portion of the brake band for applying a pulling action thereto, means for supporting the roller bar for turning movement, means for operating said roller bar, and a toggle connected with the brake band intermediate the wheels.

7. In a mine car, the combination with a plurality of wheels at a side of the car, of a brake band extending over the plurality of wheels, means for anchoring an end portion of the brake band, a roller bar having an out-turned arm connected with the opposite end portion of the brake band for applying a pulling action thereto, means for mounting said roller bar for turning movement, a plate connected with the brake band intermediate the wheels, a toggle adjustably connected with the plate, and means for pivotally supporting the toggle.

8. In a mine car, the combination with a plurality of wheels at a side of the car, of a brake band extending over the wheels, means for anchoring an end portion of the brake band, means for applying a pulling action to the opposite end portion of the brake band, a plate connected with the brake band intermediate the wheels, and a toggle having adjustable connection with said plate and brake band.

9. In a mine car, the combination with a plurality of wheels at a side of the car, of a brake band extending over the wheels, means for anchoring an end portion of the brake band, means for applying a pulling action to the opposite end portion of the brake band, a plate connected with the brake band intermediate the wheels, a toggle having adjustable connection with said plate and brake band, means for holding the brake band and plate in an adjusted position relative to the toggle, and means for pivotally supporting the toggle.

10. In a mine car, the combination with a plurality of wheels at a side of the car, of a brake band extending over the wheels, means for applying pressure to the brake band of one wheel through the action of the brake band acting on another wheel, said brake-band being depressed toward the horizontal plane of the lower edges of the wheels.

11. In a mine car, the combination with a plurality of wheels at a side of the car, of a brake band extending over the wheels, means for anchoring an end portion of the brake band, means for applying braking pressure to the plurality of wheels by a pulling action applied to an end portion of the brake band and means between the wheels for holding said brake-band between the wheels in a depressed position toward the horizontal plane of the lower edges of the wheels.

12. In a mine car, the combination with a plurality of wheels at a side of the car, of a brake band extending over the wheels, means for anchoring an end portion of the brake band, means for applying a pulling action to the opposite end portion of the brake band, and brake band depressing means connected with the brake band intermediate the wheels.

13. In a mine car, the combination with a plurality of wheels at a side of the car, of a brake band extending over the wheels, means for anchoring an end portion of the brake band, means for applying a pulling action to the opposite end portion of the brake band, and guide means for the brake band arranged intermediate the wheels.

14. In a wheeled vehicle, the combination with two wheels at a side of the vehicle, of a brake band extending over the wheels, means for forcing the brake-band into frictional engagement with one wheel through the action of the brake-band acting on the other wheel, a portion of said brake-band between the wheels being held substantially below the horizontal plane of the tops of the wheels.

15. In a wheeled vehicle, the combination with two wheels at a side of the vehicle, of a brake band extending over the wheels and downward between the wheels to a point substantially below the horizontal plane of the tops of the wheels, means for anchoring an end portion of the brake band, and means for applying a pulling action to the unanchored end portion of the brake band for applying braking pressure to both wheels.

16. In a mine or similar car, the combination with a plurality of wheels at a side of the car, of a brake band extending over the wheels, means for applying braking pressure to one wheel through the action of the brake band acting on another wheel, said brake band having a section between the wheels which is held substantially below the horizontal plane of the tops of the wheels when braking pressure is applied to the wheels.

HUGH W. SANFORD.